Sept. 6, 1938.  A. P. A. TEN BROEK  2,129,108
CLUTCH
Filed April 17, 1936  4 Sheets-Sheet 1

Inventor
Alexander P.A.TenBroek
By
Atty.

Sept. 6, 1938.  A. P. A. TEN BROEK  2,129,108
CLUTCH
Filed April 17, 1936  4 Sheets-Sheet 4

Inventor
Alexander P. A. Ten Broek
By
Atty

Patented Sept. 6, 1938

2,129,108

UNITED STATES PATENT OFFICE 2,129,108

CLUTCH

Alexander P. A. ten Broek, Kediri, Java, Dutch East Indies

Application April 17, 1936, Serial No. 75,006 In the Netherlands April 18, 1935

3 Claims. (Cl. 192—58)

This invention relates to fluidic, i. e. pneumatic or hydraulic, clutches.

The object of the invention is to provide an apparatus of this type of novel and efficient construction, capable of being easily controlled and maintained in effective working order.

The invention is illustrated in the accompanying drawings, in which.

Figure 1:
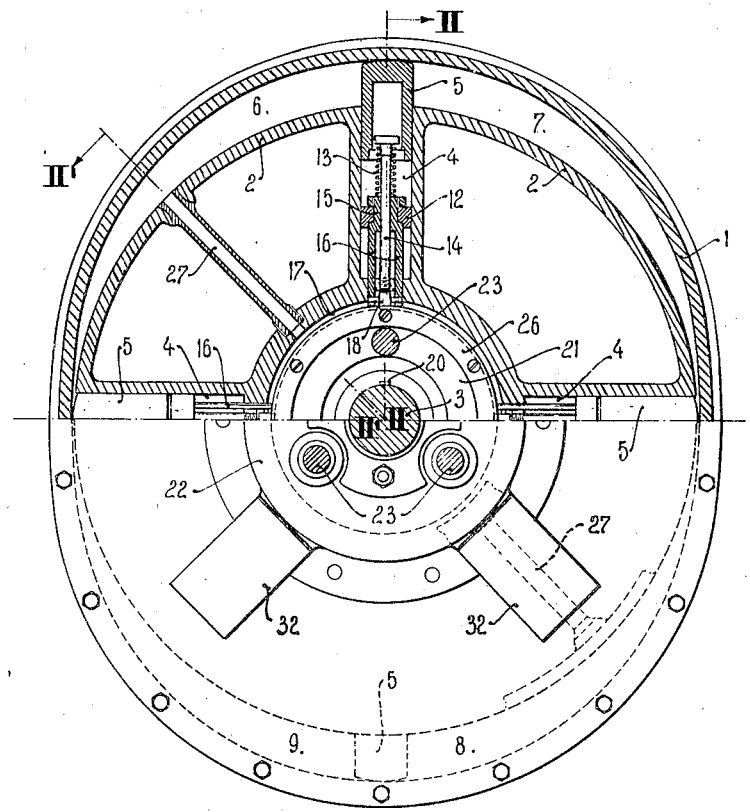
Fig. 1 is a sectional view, the upper half being a section on line I—I of Fig. 2 and the lower half a sectional view on the line I'—I' of Fig. 2, the hydraulic clutch being shown in clutching position.
Figure 2:
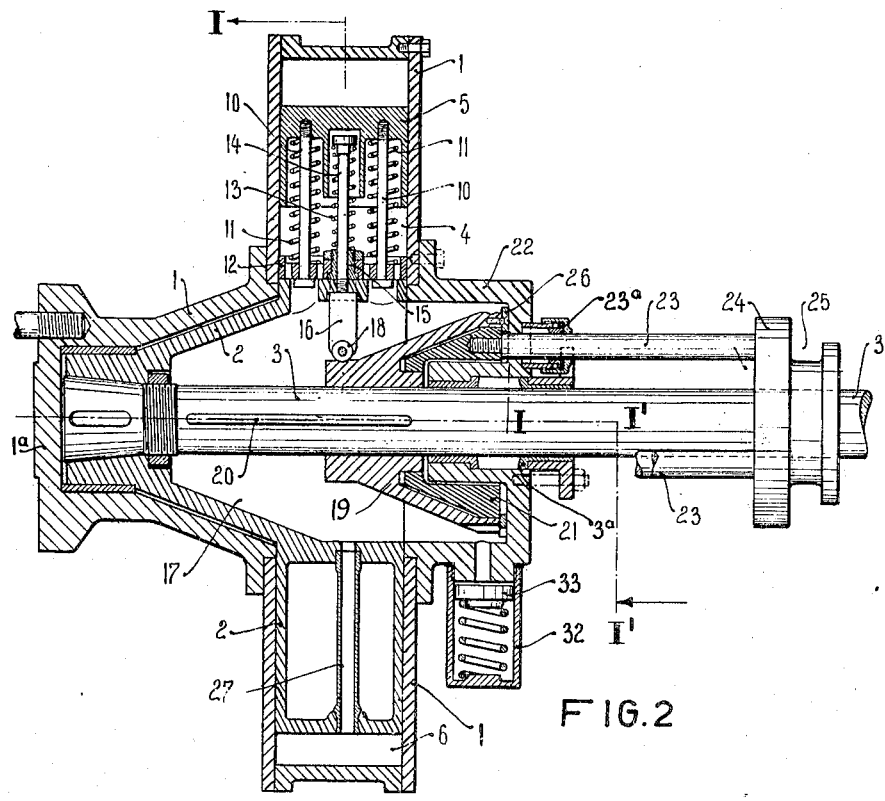
Fig. 2 is a sectional view, the upper half being taken on the line II—II of Fig. 1, the lower half being a sectional view on line II'—II' of Fig. 1, the clutch element being in declutching position.
Figure 6:
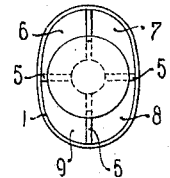
Fig. 6 is a diagrammatic view of the modified form of clutch.

The numeral 1 denotes a substantially flat-sided casing composed of different parts suitably joined together and secured to a shaft 1a. Said casing encloses a hollow space having an oval cross-section and housing a cylindrical rotor 2 rigidly secured to a shaft 3 coaxial with the shaft 1a. The flat side faces of the rotor 2 have a sliding fit with the flat inner faces of the side walls of casing 1. The outer diameter of the rotor 2 is equal to the minimum diameter of the aforesaid oval space. Consequently, the casing 1 and the rotor 2 confine two crescent-shaped chambers. The chambers of the clutch illustrated in Figs. 1 and 2 are filled with liquid. It may be noted, however, that the rotor of a hydraulic clutch need not have a diameter equal to the minimum diameter of the oval space. The outer diameter of the rotor 2 of the hydraulic clutch diagrammatically shown in Fig. 6 is slightly smaller than the minimum diameter of the aforesaid oval space, so that the two crescent-shaped chambers communicate with one another.

The rotor 2 is provided with four radial slots 4 extending through its full width and spaced 90° apart. Fitted in each of said slots is a piston or slide 5 adapted to reciprocate therein and, when assuming its extreme outward positions, to remain in sealing engagement with the inner face of the circumferential wall of the oval casing so as to divide the crescent-shaped chambers into four compartments 6, 7, 8 and 9.

The pistons 5 are adapted to be yieldingly pressed against the inner face of the circumferential wall of casing 1 so as to snugly follow said face when the casing and the rotor that is to say the driven and the driving shaft are rotated relative to one another. If, for instance, the driving shaft 3 with the rotor 2 with the pistons 5 is turned in clockwise direction relative to the driven shaft 1a with the casing 1, the volumes or capacities of the diametrically opposed compartments 6 and 8 will increase, while those of the remaining compartments 7 and 9 will decrease. It follows that the liquid pressure will decrease in the compartments 6 and 8 and increase in compartments 7 and 9, so that a couple is produced which counteracts and finally prevents rotation of the driven and the driving shaft relative to one another. If, however, the pistons 5 are retracted so as to be located entirely within their respective slots 4, the parts 1 and 2, and also the shafts 1a and 3 to which these parts are respectively secured, are free to rotate the one with respect to the other.

Screwed into each piston 5 are two inwardly projecting guide bolts 10 each encircled by a coiled spring 11, the lower ends of said springs bearing against a perforated bridge piece 12 adapted to be moved radially outwards within the slot 4 against the tendency of a third coiled spring 13. The bolts 10 project through suitable bores in the bridge piece 12, with which they have a sliding fit, and each bolt is provided with an enlarged head adapted to bear against the bottom face of said piece 12.

Spring 13 encircles a third guide bolt 14 screwed with its lower end into the wall of the rotor 2. The upper end of spring 13 bears against an enlarged head of bolt 14, its lower end bearing against the bridge piece 12 through the medium of a sleeve 15, which has a sliding fit with bolt 14 and extends through a bore in member 12, to which it is suitably secured. The lower end 16 of the sleeve 15 is bifurcated, the prongs extending through apertures in the wall of the rotor 2 so as to radially project into the central space 17 of the rotor hub. The free inner ends of the prongs carry a roller 18 adapted to cooperate with the outer face of a cone 19 arranged for sliding movement over the shaft 3 but prevented by a key 20 from rotation with respect thereto.

If cone 19 is moved to the left (Fig. 2), the sleeves 15 and the bridge pieces 12 mounted thereon are thus forced radially outwards against the tendency of their respective springs 13. Owing thereto, the pistons 5 tend to move radially outwards under the action of their respective springs 11, until their outer faces yieldingly engage the circumferential inner wall of casing 1. The device then assumes its clutching position.

When the cone 19 is retracted, i. e. moved to the right (Fig. 2), the pistons 5 with associate parts are urged inwards by the springs 13, whereby the casing 1 and the rotor 2 are de-clutched.

In order that cone 19 may be actuated as described, a second cone 21 is coaxially provided within a conical recess on the right hand side thereof. Screwed into the cone 21 are three rods 23, which are circumferentially spaced through 120° and project through a cover 22 of the casing 1. The right hand side ends of said rods are secured to a ring 24 having a circumferential groove 25 for receiving the prongs of a fork (not shown), through which the ring 24 with associate parts may be moved to the left and to the right by means of a hand lever.

The cones 19 and 21 are rotatable with respect to one another. A ring 26 secured to the annular right hand side face of cone 19 serves to lock the inner cone 21 and prevent the same from moving out of the cone 19. The rods 23 as well as the shaft 3 are sealed with respect to the cap 22 by means of stuffing boxes 23a and 3a respectively.

If the crescent-shaped chambers defined by the casing 1 and the rotor 2 are entirely filled with liquid, it would not be possible, owing to the fact that liquid is practically incompressible, for the pistons 5 to be moved outwards into them, unless special provision is made for allowing liquid to escape therefrom. To this end, the rotor 2 is provided with two diametrically opposed radial passages 27 connecting said chambers with the central space 17. Since these passages are diametrically opposed, the pressures obtaining at their outer ends are equal under all conditions. In the embodiment shown, the passages open into the compartments 6 and 8, and since space 17 also communicates, through the perforated bridge piece 12, with the slots 4, the pistons 5 can easily be moved radially inwards or outwards. During their outward movement, liquid will flow from the crescent-shaped chambers into the central space 17, and vice versa.

For the reason stated above, namely that the liquid is practically incompressible, it would also be impossible for the cone 19 to be shifted to the left, since the rods 23 cannot be forced into the central space 17, which is entirely filled with liquid. With a view thereto, a cylinder 32 communicating with said space and provided with a spring-loaded piston 33 is mounted on the cap 22, but it is to be understood that also other means may be provided.

Figure 3:
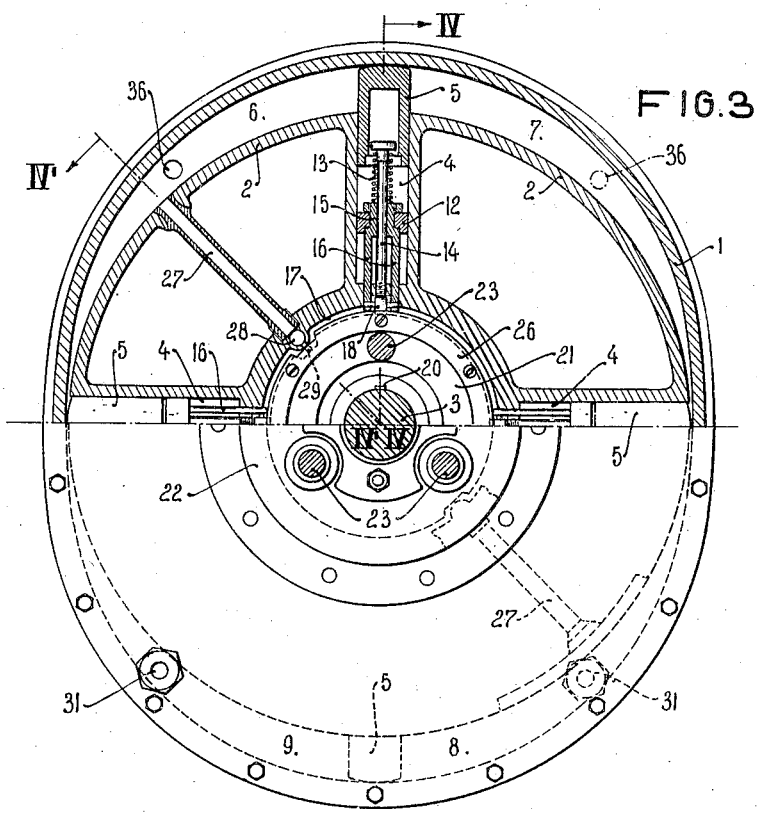
Fig. 3 is a sectional view, the upper half being on line III—III of Fig. 4 and the lower half on line III'—III' of Fig. 4, the construction showing a pneumatic clutch in clutching position.
Figure 4:
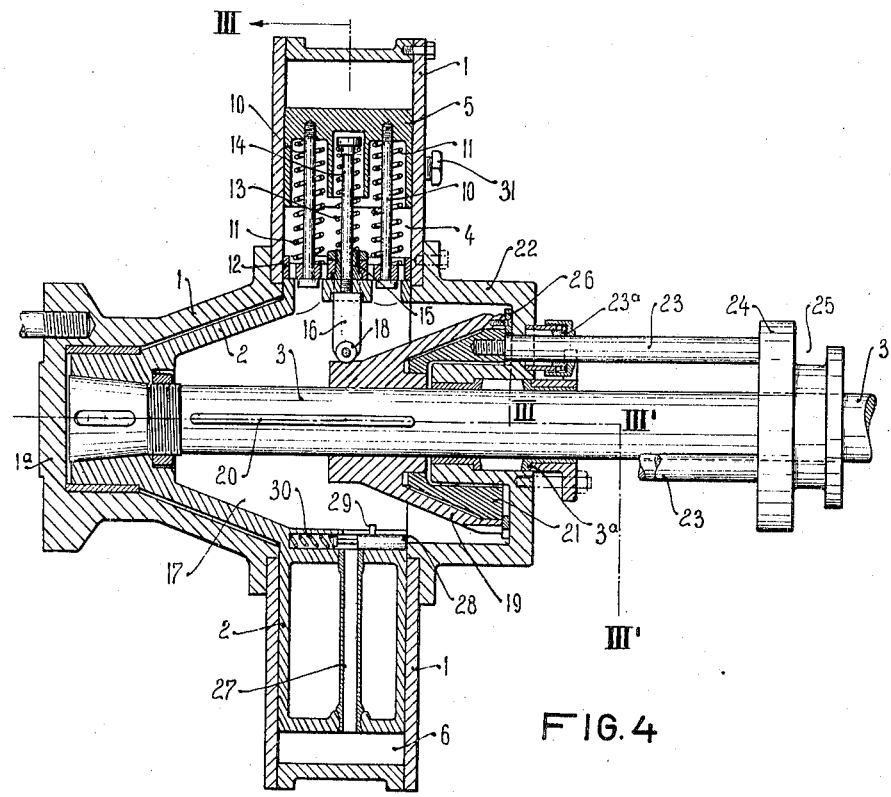
Fig. 4 is a sectional view, the upper half being on line IV—IV of Fig. 3 and the lower half on line IV'—IV' of Fig. 3, showing the pneumatic clutch in declutching position.

The device illustrated in Figs. 3 and 4 is a pneumatic clutch. Since its construction is very similar to that of the hydraulic clutch shown in Figs. 1 and 2, it is not necessary to describe it in every detail. The crescent-shaped chambers here are filled with air or another gas instead of liquid, and they are also conveniently connected with the central space 17 through the passages 27, as this connection facilitates the outward movement of the pistons 5. This, however, would result in an increase of the clearance space. To avoid this inconvenience, slide valves 28 may be provided for closing the passages 27 when the pistons 5 are forced outwards. When the cone 19 is moved to the left, the ring 26 will engage a projection 29 provided on each of said slide valves a short moment before reaching its extreme left hand side position, whereby said valves are closed against the action of springs 30. When the cone 19 is retracted, the springs 30 act to open the valves 28.

With a pneumatic clutch it is also desirable for the side walls of the casing 1 to be provided with snifting valves 31 allowing air to enter into those compartments wherein, owing to increasing volume, the air pressure should decrease below a predetermined value. Otherwise, and owing to the air from the compression compartments 7 and 9 gradually leaking away, after a short time none of the compartments 6, 7, 8 and 9 would contain a sufficient amount of air for producing a couple of the required magnitude, and the clutch would slip, i. e. the device would become inoperative. Thus, the snifting valves 31 have for their duty to keep the clutch filled with a sufficient amount of air.

Figure 5:
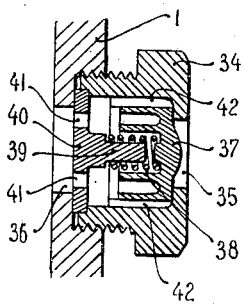
Fig. 5 is an enlarged vertical sectional view of the snifting valve.

The snifting valve 31 shown in Fig. 5 comprises a plug 34 adapted to be screwed into the side wall of the casing 1 (Figs. 3 and 4). To allow air to enter into the chambers (in a direction from the right to the left in Fig. 5), holes 35, 36 are provided in the bottom of the plug 34 and in said side wall, respectively. The bottom forms a seat for a spring-loaded valve body 37, the coiled spring 38 of which encircles a projecting pin 39 of a plate 40, which serves as an abutment for said spring and is provided with holes 41. Said plate is held in its place by the plug 34. The valve body has radially projecting ribs 42 to form passages for the air.

The operation of the pneumatic clutch is as follows: If the cone 19 is moved to the left, the pistons 5 tend to move radially outwards and to divide the crescent-shaped chambers into four compartments 6, 7, 8 and 9. The device then assumes its clutching position. By turning the driving shaft 3 with the rotor 2 in clockwise direction relative to the driven shaft 1a and the casing 1, the volumes of the compartments 6 and 8 will increase, while those of the compartments 7 and 9 will decrease. Owing thereto the gas pressure will be reduced in the compartments 6 and 8 and increased in compartments 7 and 9, so that a couple is produced which counteracts and tends to prevent rotation of the driving and the driven shafts relative to one another. Since, however, the gas pressure in the compartments 6 and 8 will then be lower than the pressure outside the casing, the snifting valves of those chambers will open and allow air to enter. In that case the clutch will not fully slip, if, as stated above, the air from the compression compartments 7 and 9 gradually leaks away, as the compartments 6 and 8 are then filled with a sufficient amount of air to again produce a strong counteracting couple. It is obvious that the slip cannot be entirely avoided, but by means of the snifting valves it can be reduced to a minimum.

If the pistons 5 are retracted by moving the cone 19 to the right, the shafts 1a and 3 are free to rotate the one with respect to the other.

What I claim is:—

1. A clutch comprising a driving shaft and a driven shaft coaxial therewith, a body fixed upon the driving shaft and a second body fixed upon the driven shaft, the one body being located within the other so as to define chambers having different cross-sectional areas in different radial planes and said chambers being filled with liquid and located in pairs the one diametrically opposed to the other, a hollow space centrally within the inner body, passages connecting said chambers with said hollow central space, radial slots in the inner body, pistons adapted to reciprocate in said slots and to fill up the cross-sectional areas of said chambers, resilient means for moving said pistons into and out of position for filling up said cross-sectional areas, and means for actuating said resilient means.

2. A clutch comprising a driving shaft and a driven shaft coaxial therewith, a body fixed upon the driving shaft and a second body fixed upon the driven shaft, the one body being located within the other so as to define two chambers having different cross-sectional areas in different radial planes and said chambers being filled with gaseous fluid and located in pairs the one diametrically opposed to the other, a hollow space centrally within the inner body, passages connecting said chambers with said hollow central space, radial slots in the inner body, pistons adapted to reciprocate in said slots and to fill up the cross-sectional areas of said chambers, resilient means for moving said pistons into and out of position for filling up said cross-sectional areas, spring-loaded valves adapted to close said passages, means for actuating said resilient means, and means associated with said actuating means for opening said valves.

3. A clutch comprising a driving shaft and a driven shaft coaxial therewith, a body fixed upon the driving shaft and a second body fixed upon the driven shaft, the one body being located within the other so as to define chambers having different cross-sectional areas in different radial planes and said chambers being filled with gaseous fluid and located in pairs the one diametrically opposite the other, radial slots in the inner body, pistons adapted to reciprocate in said slots and to fill up the cross-sectional areas of said chambers, resilient means for moving said pistons into and out of position for filling up said cross-sectional areas, means adapted to maintain a predetermined minimum gas pressure in said chambers, and means for actuating said resilient means.

ALEXANDER P. A. ten BROEK.